United States Patent [19]

Koegl et al.

[11] Patent Number: 5,013,886
[45] Date of Patent: May 7, 1991

[54] REAL-TIME MAGNETIC-FLUX BREAKTHROUGH DETECTION METHOD AND SYSTEM FOR LASER DRILLING

[75] Inventors: Rudolph A. A. Koegl, Niskayuna; Richard A. Hogle, Schenectady, both of N.Y.

[73] Assignee: General Electric Company, Schenectady, N.Y.

[21] Appl. No.: 556,687

[22] Filed: Jul. 23, 1990

[51] Int. Cl.⁵ ............................................. B23K 26/02
[52] U.S. Cl. ............................ 219/121.83; 219/121.62; 219/121.78
[58] Field of Search ........... 219/121.7, 121.71, 121.83, 219/121.82, 121.61, 121.62, 121.6, 121.85, 121.78

[56] References Cited

U.S. PATENT DOCUMENTS

| | | | |
|---|---|---|---|
| 4,473,737 | 9/1984 | Anthony | 219/121.71 |
| 4,504,727 | 3/1985 | Melcher et al. | 219/121.62 |
| 4,608,480 | 8/1986 | Bizot et al. | 219/121.7 |
| 4,633,058 | 12/1986 | Jones | 219/121.7 |
| 4,689,467 | 8/1987 | Inoue | 219/121.76 X |
| 4,764,655 | 8/1988 | Ortiz, Jr. et al. | 219/121.83 |
| 4,789,770 | 12/1988 | Kasner et al. | 219/121.7 |
| 4,818,841 | 4/1989 | Silva et al. | 219/121.83 |
| 4,873,414 | 10/1989 | Ma et al. | 219/121.7 |
| 4,939,336 | 7/1990 | Meyer et al. | 219/121.62 |

Primary Examiner—Bruce A. Reynolds
Attorney, Agent, or Firm—Marilyn Glaubensklee; James C. Davis, Jr.; Paul R. Webb, II

[57] ABSTRACT

Detection of the breakthrough of a laser beam through a workpiece wall uses one or more magnetic field pick-up coils. The coils are disposed on the drill side (side upon which the laser beam is impinging) of the workpiece. The coils sense the magnetic fields generated in the ionized plasma of particles escaping from the impact of the laser on the surface. The coils are connected to a breakthrough detector which generates a breakthrough signal upon the plasma and associated magnetic fields disappearing at breakthrough. The breakthrough signal is used to turn off the laser and/or change the application point at which the laser beam strikes the workpiece.

20 Claims, 4 Drawing Sheets ns relates to a method and system for
detecting when a laser beam has broken through the
surface of a workpiece. More specifically, this invention
relates to breakthrough detection by sensing changes in
the magnetic field corresponding to the breakthrough
of a wall of the workpiece by a laser beam.

Lasers are sometimes used for drilling holes in various parts. When using a high-power laser beam to drill a hole through a workpiece, it is useful to know when the beam has broken through the wall of the workpiece. Upon this "breakthrough" occurring, one would turn off the laser. The relative position between the laser and the workpiece could be changed by either moving the workpiece or moving the laser such that another hole could be drilled in the same workpiece. Alternately, another workpiece could be placed in the path of the laser, and it could then be turned on in order to drill a hole in the second workpiece.

Various arrangements have been used for determining when the breakthrough occurs. Some breakthrough detection schemes rely upon having phototransistor-type detectors oriented towards the backside (i.e., side opposite the drill side upon which the laser beam is directed) of the workpiece. When the breakthrough occurs, the detectors sense the light and provide a signal indicating that breakthrough has occurred.

Although the phototransistor-type detectors have been somewhat useful, it may be difficult or impossible to properly position a photo-detector of such a system when drilling holes in parts with complex geometries. For example, problems in positioning of the photo-detector may make this type of technique unsuitable for use on cylinders or tori. Among prior patents related to the laser drilling or laser machining of workpieces such as machine parts in U.S. Pat. No. 4,608,480, issued Aug. 26, 1986, to Bizot et al. That patent discloses control of the operating parameters of a laser by sensing the sounds emitted by the melting of the workpiece.

U.S. Pat. No. 4,504,727, issued Mar. 12, 1985, to Melcher et al., discloses a laser drilling system having feedback control based upon sensing an acoustic signal arising from subjecting the workpiece to a laser.

The Kasner et al. U.S. Pat. No. 4,789,770, issued Dec. 6, 1988, shows an arrangement for controlling depth in a laser drilling system. An optical sensing arrangement is used to detect the depth of the hole which is drilled.

The Inoue U.S. Pat. No. 4,689,467, issued Aug. 25, 1987, shows a laser machining apparatus where a source of plasma is used in combination with the laser. Additionally, infrared rays radiated from the workpiece may be sensed in order to automatically adjust the laser beam.

The Ortiz, Jr. et al. U.S. Pat. No. 4,764,655, issued Aug. 16, 1988, shows a laser materials processing system including an arrangement to determine the beam diameter by imaging techniques.

The Anthony U.S. Pat. No. 4,473,737, issued Sep. 25, 1984, shows a laser drilling technique whereby holes are drilled in a transparent or substantially transparent material (i.e., transparent to the laser radiation) with the hole starting on the side of the workpiece or machine part opposite the side on which the laser beam impinges.

Although various known techniques for controlling laser machining processes have been useful, they have often been subject to one or more several disadvantages. Those techniques for breakthrough detection which rely upon optical sensing at the backside of the drilled part are not suitable for use with workpieces having complex geometries as discussed above. Those optical sensing arrangements which are visually observing the drilling operation from the front or drill side of the workpiece may fail to operate properly because of the various debris which is sprayed outwardly on the drill or front side of the workpiece. Many prior arrangements for controlling laser drilling operation require complex calibration procedures and complex circuitry.

OBJECTS AND SUMMARY OF THE INVENTION

Accordingly, it is a primary object of the present invention to provide a new and improved breakthrough detection method and apparatus.

A more specific object of the present invention is to provide for breakthrough detection without the need for placing components on the backside (i.e., opposite the drill side on which the laser beam is impinging) of a workpiece.

A further object of the invention is to provide breakthrough detection which is highly reliable and is relatively low in cost and complexity.

A still further object of the present invention is to provide a method and system of laser machining utilizing breakthrough detection. Still further, this means of breakthrough detection is especially well suited for use on cylinders, tori and other complex, closed geometries.

The above and other objects of the present invention, which will become more apparent when the accompanying drawings are read in conjunction with the detailed description, are realized by a method of applying a laser beam to a workpiece (i.e., the machine part which is to be subjected to the laser beam) including the step of placing at least one magnetic field pick-up coil adjacent to a surface on a front (i.e., the drill side) of the workpiece. The laser beam is applied to the surface to drill a hole in the surface, the laser beam causing a magnetic field in an ionized plasma of particles escaping from the surface. A further step is using the coil to sense magnetic field change occurring upon breakthrough of the surface by the laser beam. The method further preferably includes the step of generating a breakthrough signal upon the breakthrough and the step of supplying the breakthrough signal to a control which then modifies the application of the laser beam. If the method is used for drilling a distinct hole, occurrence of the breakthrough signal causes the control to turn off the laser beam. In an alternate arrangement, the method may be used for cutting a workpiece by drilling a hole, after which the breakthrough signal causes the control to in turn cause the laser beam to strike a new application point on the surface.

The coil may be disposed coaxially with the laser beam and in a stream of the ionized plasma of particles. Alternately the coil may be disposed to the side of the laser beam and in a stream of the ionized plasma of particles. A further alternative includes placing two coils adjacent the surface such that the magnetic field of the ionized plasma of particles is sensed by each of the two coils. If two or more coils are used, one of the coils is placed to the side of the laser beam, whereas another of the coils is coaxially with the laser beam. Both of the coils would be disposed in the stream of the ionized plasma of particles. When using two coils, the breakthrough signal is generated during the drilling process when neither of the two coils is sensing the magnetic field of a stream of ionized plasma of particles.

The system of the present invention may be described as a system for applying a laser beam to a workpiece including at least one magnetic field pickup coil and a breakthrough detector connected to the coil. The breakthrough detector includes means to generate a breakthrough signal when a laser beam breaks through a workpiece to cause a magnetic field change sensed by the coil. The system may further include a laser for applying a laser beam to the workpiece. The breakthrough detector further includes means to generate a plasma-detected signal upon the coil sensing that a laser beam is striking the workpiece to generate a magnetic field in an ionized plasma of particles escaping the workpiece. A control is operable to receive the breakthrough signal and to modify application of the laser beam to the workpiece upon occurrence of the breakthrough signal. If the system is designed to drill individual holes, the control turns off the laser upon occurrence of the breakthrough signal. Alternately, if the system is for cutting a workpiece by, in effect, drilling a series of closely spaced holes, the control causes the laser beam to strike a new application point on the workpiece upon occurrence of the breakthrough signal.

The system may use two coils connected to the breakthrough detector. In that case, the means to generate the breakthrough signal generates the breakthrough signal only when neither of the coils is sensing the magnetic field of a stream of ionized plasma of particles, and the part is being drilled. Further, that arrangement may also include means to generate a plasma-detected signal upon either of the two coils sensing that the laser beam from the laser is striking the workpiece to generate a magnetic field in an ionized plasma of particles escaping the workpiece. The system may further include means to generate a laser-on signal upon the laser beam on. In that case, the breakthrough detector may include means to receive the laser-on signal and to inhibit production of the breakthrough signal unless the laser is on.

BRIEF DESCRIPTION OF THE DRAWINGS

The above, and other features of the present invention, will be more readily understood when the following detailed description is considered in conjunction with the accompanying drawings wherein like characters represent like parts throughout the several views and in which.

DETAILED DESCRIPTION

Figure 1:
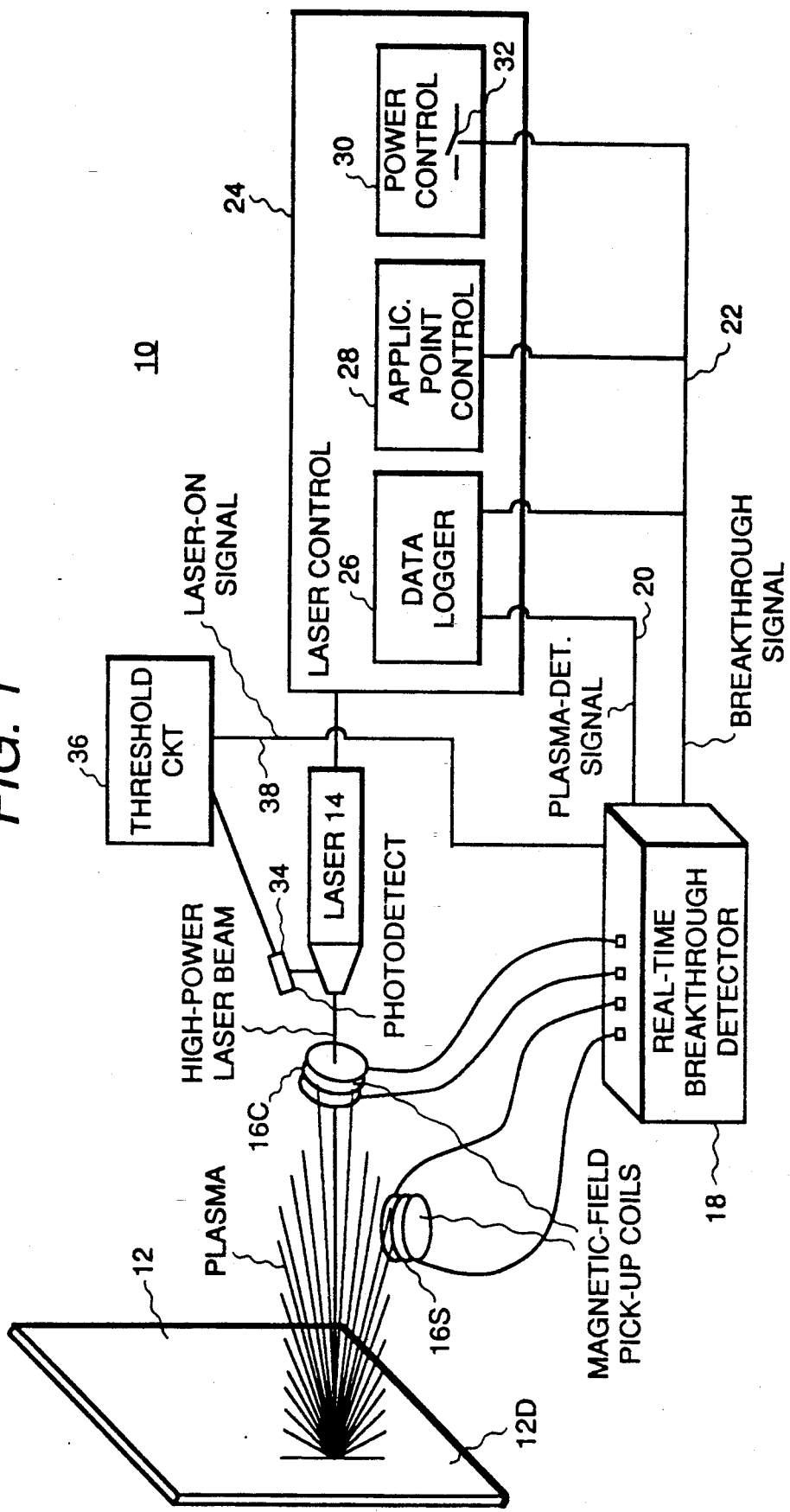
FIG. 1 is a schematic of an overall system according to the present invention.

The system 10 of FIG. 1 is applying a high-power laser beam to a part or workpiece 12 which is to be drilled. The machine part or workpiece 12 has been shown as a flat piece for ease of illustration, but the invention is especially well adapted to control of the laser drilling of a hole in a cylinder or other complex shape, which shape prevents one from putting a portion of a detection system behind the front or drill surface of the workpiece. Thus, it will be apparent from FIG. 1 that all of the components of the system 10 are located on the front or drill side 12D of the workpiece 12.

The system 10 includes a laser 14, which may be a continuous laser or a pulse-type laser. Any of various types of high-power lasers could be used.

Before discussing further components of the system 10, it will be useful to discuss what occurs when the illustrated high-power laser beam from laser 14 strikes an application point on the front side or surface 12D of the workpiece 12. The laser energy acting on the surface causes portions of the surface to melt and vaporize. Transient magnetic fields are generated in an ionized plasma of particles escaping from the drill location. When the laser beam breaks through to the back of the surface opposite drill surface 12D, the plasma (and associated magnetic fields) will disappear. Even if another wall is behind the wall through which the breakthrough has occurred, only a relatively small amount of the plasma generated by such a second wall would likely pass through the hole in the first wall. By monitoring the level of the plasma-induced magnetic fields, the occurrence of laser breakthrough can be detected.

The present invention detects the plasma-induced magnetic fields by using at least one magnetic field pick-up coil. Preferably, two coils 16C and 16S would be used. A concentric coil 16C would be disposed such that it extends completely around the laser beam from laser 14, whereas a side coil 16S is disposed to the side of the laser beam as illustrated. When the beam from laser 14 first strikes the surface, the plasma is rather broadly dispersed or spread out over a wide angle and one or more coils such as 16S may be used to detect the magnetic field associated with the plasma. After the beam from laser 14 has drilled a hole partially through the machine part or workpiece 12, the plasma will have a greater tendency to travel along the axis of the laser beam itself, in which case the concentric coil 16C is best disposed to sense the magnetic field generated in the plasma movement. Depending upon the characteristics of the material making up the workpiece 12, the size and shape of the coil, and the distance between the coil and the surface which is being drilled, a single coil may be sufficient.

Although not illustrated in FIG. 1, the coils 16C and 16S could be mounted to the laser 14 or mounted to a common support structure in any of various ways.

The coils 16C and 16S are illustrated schematically in FIG. 1, but the coils may be encapsulated in a ceramic or other coating or housing to protect the wires of the coil itself from adverse effects caused by the plasma. Such a protective coating (not shown) might be arranged to allow the plasma particles to pass along the axis of symmetry of the coil (the axis of symmetry of coil 16C coincides with the beam from laser 14), or alternately, such a protective coating or housing may completely close off the interior of the coil. In other words, in the first case, the housing would result in a ring-shaped device wherein plasma could pass through the ring, whereas in the second or closed case, the coil and its housing would be plate-shaped. In the closed case wherein the coil is shaped like a plate, the coil would still function to sense magnetic field from plasma passing adjacent to it.

The coils 16C and 16S are connected to a breakthrough detector 18. The breakthrough detector 18 is realtime, meaning that it is actually detecting when breakthrough occurs and is not simply guessing when breakthrough should occur based on prior experience. The inner workings of the breakthrough detector 18 will be discussed in more detail below. However, a broad overview of its operation is useful at this stage. The breakthrough detector 18 generates a plasma-detect signal on line 20 when either or both of the coils 16C and 16S have detected the magnetic field associated with the plasma. In other words, this signal indicates that drilling is actually underway. The breakthrough detector 18 further generates a breakthrough signal on line 22 which indicates that the beam from laser 14 has broken through the wall or portion of workpiece 12 which is being drilled. Both the plasma-detect signal on line 20 and the breakthrough signal on line 22 are supplied to a laser control 24 which may include many standard components (not illustrated) for control of the laser 14. Additionally, the laser control 24 may include a data logger 26, an application point control 28, and a power control 30 which merit more detailed discussion.

The data logger 26 may be used to store data corresponding to the occurrence of the plasma-detect signal on line 20 and the breakthrough signal on line 22. It may simply store the time lag between the two signals. The data logger 26 has been shown as part of the laser control 24, but may be considered as a separate component.

The breakthrough signal on line 22 is also supplied to a power control 30 having a controlled switch 32. The controlled switch 32 is simply a switch which, upon opening, stops the laser 14 from emitting the beam. The switch 32 may simply cut power to the laser 14.

If the system 10 is to be used simply for drilling individual holes within one or more workpieces or machine parts, one would use a switch such as 32 to simply turn off the laser 14 and/or the workpiece 12 could then be moved so that another hole could be drilled in the same workpiece or a different workpiece. However, the laser control 24 of FIG. 1 also allows the system 10 to be used for cutting a workpiece. If one is trying to very precisely cut a workpiece, the arrangement 10 may, in effect, allow one to drill a series of very closely spaced holes in order to effect the cutting of the workpiece. To that end, the breakthrough signal 22 is fed to the previously mentioned application point control 28. Upon the breakthrough signal occurring, the application point control 28 causes the laser beam from laser 14 to strike a new application point on the workpiece 12. More specifically, the control 28 may be robotic control to move the workpiece 12 and/or to move the laser 14 so that the beam is striking the workpiece immediately adjacent the drilled hole. Alternately, the application point control 28 could rotate a mirror (not shown) or otherwise optically cause the beam from laser 14 to strike the workpiece at a new application point. Regardless of the technique used to cause the beam to strike a new application point, the beam is applied until breakthrough occurs at the new location, whereupon the process may be repeated until the cut is complete.

Whether the breakthrough signal on line 22 is fed to the application point control 28, the power control 30, or some other control considered part of the laser control 24 or considered as a separate control, the control to which the breakthrough signal is fed in some sense modifies the application of the laser beam by either turning off the beam or causing it to strike a new application point on the surface of the workpiece.

It is useful to supply the breakthrough detector 18 with a laser-on signal for reasons discussed in more detail below in conjunction with FIG. 2. The laser-on signal simply tells the breakthrough detector 18 that the laser 14 is emitting a beam. Such a laser-on signal might simply operate from the laser control 24 by using a pre-existing signal which usually corresponds to operation of the laser. However, FIG. 1 shows an arrangement wherein a photodetector 34 is used to detect the light corresponding to the laser beam from laser 14. Depending upon the sensitivity of the photodetector 34, which may be a phototransistor, photodiode, or any of several kinds of light-sensitive elements, it may be sufficient to simply have the photodetector element viewing the beam from laser 14 from the side. Alternately, one could have a beam-splitter (not shown) wherein a small portion of the beam would be directed right at the photodetector element 34. The photodetector element 34 is connected to a threshold circuit 36 which simply insures that the output of the photodetector element 34 is of sufficient magnitude to indicate that the laser is on. The threshold circuit 36 may simply be a comparator. The output from the threshold circuit 36 is the laser-on signal appearing on line 38. The output of the threshold circuit 36 would be one of two values: A value corresponding to the laser-on signal, and a second value indicating that the laser is not on. Line 38 is connected to the breakthrough detector 18 so that the breakthrough detector 18 senses whether the laser 14 is turned on.

Figure 2:
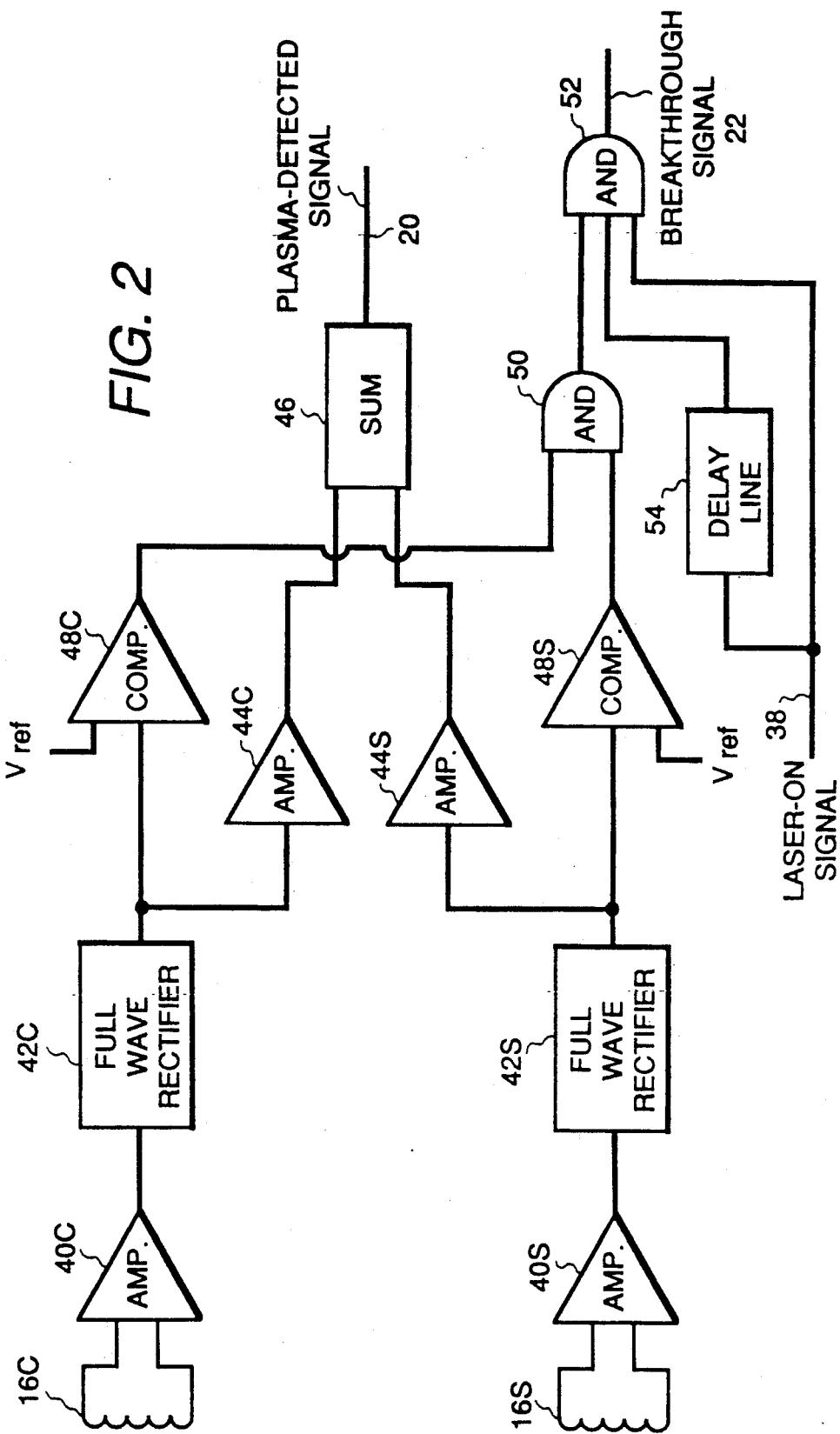
FIG. 2 shows a first embodiment circuit which may be used as the breakthrough detector in the arrangement of FIG. 1.

With reference now to FIG. 2, a possible circuit for implementing the breakthrough detector 18 of FIG. 1 will be discussed. The coil 16C is connected to an instrumentation amplifier 40C, the output of which is a voltage dependent on the magnetic field sensed by coil 16C. The output from amplifier 40C is fed to a rectifier 42C, (preferably full wave, but could be half wave) for rectification purposes. The output of rectifier 42C is fed to amplifier 44C, which may simply be used to provide an appropriate level signal at its output for feeding to a summing circuit 46.

The summing circuit 46 also receives a signal dependent upon the magnetic field sensed by coil 16, this occurring by way of amplifier 40S, full-wave rectifier 42S, and amplifier 44S, each of which works identically to the corresponding one of components 40C, 42C, and 44C. (The reference voltage used by comparator 48S may be different from the reference voltage used by comparator 48C in view of the coils' different locations and, possibly, differences in size, shape and number of turns of the coils.) The output of summing circuit 46 is a plasma-detected signal which appears on line 20. Note that the signal 20 may be an analog signal in which case the data logger 26 (not shown in FIG. 2, refer back momentarily to FIG. 1) may keep track of the actual level of this signal. However, one could alternately use a comparator (not shown) to compare the signal out of summing circuit 46 with a reference voltage in order to provide a digital output signal.

If the laser which is being used is a pulse laser, the plasma-detected signal on line 20 may reflect the pulsing on and off of the laser depending upon the frequency of the duty cycle of the laser. If one wanted to avoid having the plasma-detected signal include a frequency component corresponding to the duty cycle of the laser, one could simply include a filter such as a capacitor (not shown) to smooth out such variations in the signal.

In addition to being supplied to the amplifier 44C, the output of rectifier 42C is supplied to a comparator 48C which compares the signal to a reference voltage. (If desired, an amplifier, not shown, could be used between rectifier 42C and comparator 48S to provide appropriate signal levels.) If the signal from rectifier from 42C is lower than the reference voltage (indicating that no plasma is present), the output of comparator 48C is a logic "true" signal and is supplied to AND gate 50, the other input of which is an output from comparator 48S working in the same fashion as comparator 48C. When both outputs from comparators 48C and 48S indicate that no plasma is present, the output of gate 50 will be a logic true signal.

The output of the gate 50 is supplied to AND gate 52. When the output of gate 50 is logic true, this simply indicates that neither of the coils is sensing plasma. (Stated another way, both of the coils are sensing the absence of plasma.) However, this does not necessarily mean that breakthrough has occurred. It could be that the laser is not on or it has not been on sufficiently long for the plasma to start. Therefore, the gate 52 supplies a breakthrough signal as its output only upon the output of gate 50 being a true signal when the laser-on signal is presently occurring (the signal is directly input to one of the three inputs of gate 52) and when the laser-on signal has occurred for a predetermined minimum time established by delay line 54. Thus, the breakthrough signal at the output of gate 52 will not occur when the laser is off. Additionally, the breakthrough signal will not occur immediately after turning on the laser because the delay line 54 delays one input to the AND gate 52 until after the laser has established the magnetic fields by the creation of the plasma.

Producing the breakthrough signal only upon occurrence of the laser-on signal by a gating arrangement such as that shown in FIG. 2 may help avoid false breakthrough signals which might otherwise occur when using a pulse laser. In such a laser, the energy is supplied by repeated pulses. Depending upon the duty cycle of the pulses, the coils 16C and 16S might detect the absence of plasma-induced magnetic fields during the off portion of the laser's duty cycle. This absence of plasma would, of course, be occurring because the laser is momentarily off. To avoid misreading that situation as indicative of breakthrough, the laser-on signal is supplied as an input to AND gate 52 in the manner illustrated.

Note that the coils 16C and 16S would be connected to their amplifiers 40C and 40S to provide the same polarity of output so that summing circuit 46 would be summing two signals of the same polarity.

Figure 3:
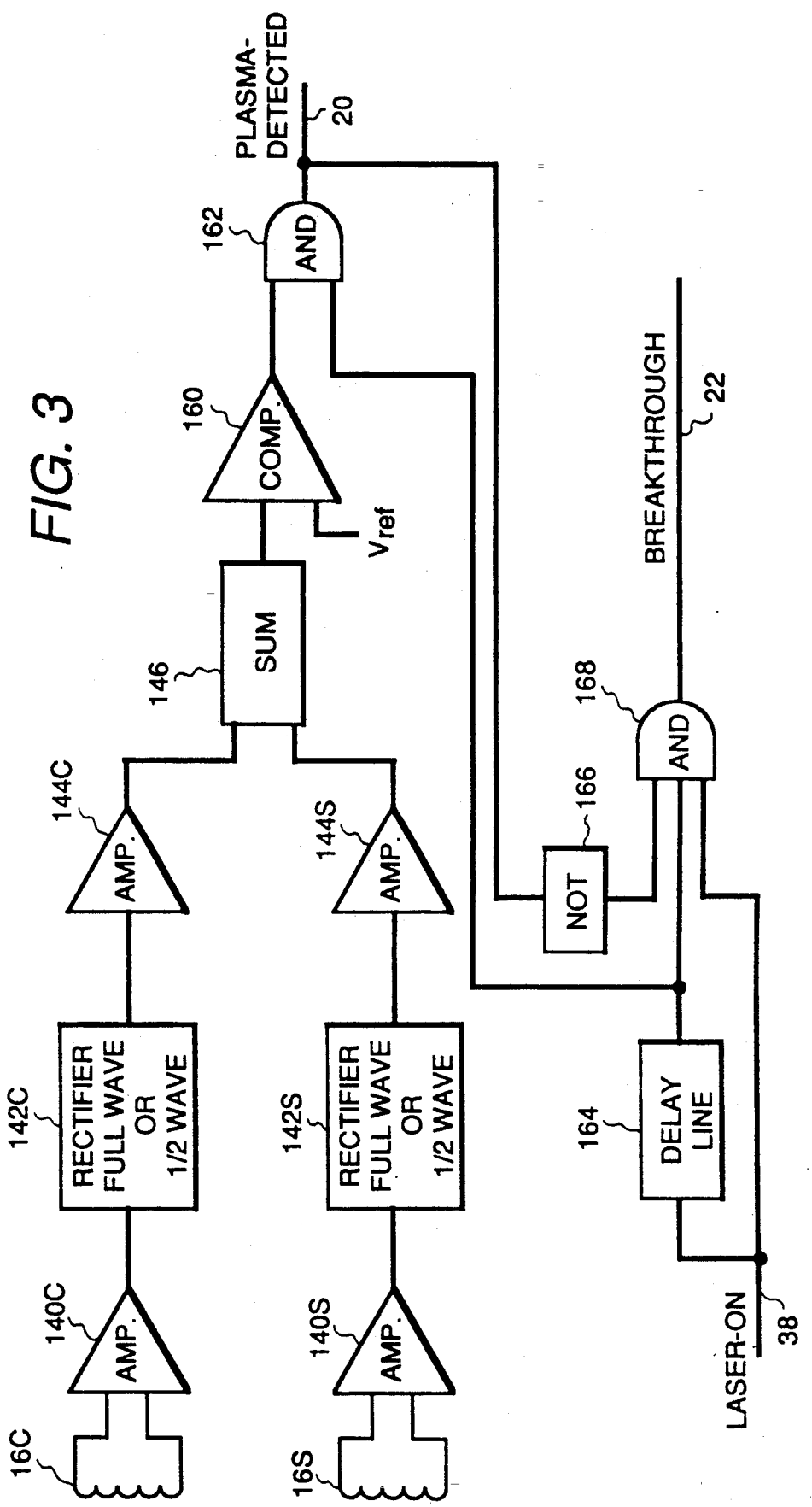
FIG. 3 shows a second embodiment circuit which may be used as the breakthrough detector.

FIG. 3 shows an alternate circuit for connection as a breakthrough detector to coils 16C and 16S and having components in the "100" series with the same last two digits as the corresponding component, if any, from the FIG. 2 arrangement. Thus components 140C, 142C, 144C, 140S, 142S, 144S, and 146 operate respectively like components 40C, 42C, 44C, 40S, 42S, 44S, and 46 of FIG. 2. However, the output of summing circuit 146 is supplied to a comparator 160 which outputs a signal only if the coils are together picking up enough signal to be greater than a reference voltage.

The output of comparator 160 goes to AND gate 162 which also receives a delayed laser-on signal from delay line 164 such that no plasma-detect signal (i.e., output of gate 162) can be generated unless the laser has been on for greater than a certain time.

The plasma-detected signal on line 20 is inverted by inverter 166 and supplied to gate 168, which also receives the laser on signal and a delayed laser on signal (from delay 164). The gate 168 will output a breakthrough only if no plasma is detected, the laser is currently on, and the laser has been on for a time delay corresponding to delay line 164.

The arrangement of FIGS. 2 and 3 assume that the laser will necessarily produce a plasma after it has been on for a period of time established by the delay lines. If not, a false positive breakthrough signal might occur. This is quite unlikely provided that the laser is actually striking the workpiece and the workpiece is of a suitable material. As will be readily appreciated by those familiar with laser machining processes, the workpiece 12 should be metal, ceramic, or some other material which will generate an ionized plasma of particles upon being struck by a laser beam.

A more sophisticated approach than that of FIGS. 2 and 3 would rely upon a memory element (not shown) such as flip-flop whereby the breakthrough signal would not be produced unless the plasma-detected signal had already been produced. Further, instead of simply looking for the absence of the plasma-detected signal or the absence of magnetic fields detected by the coils, as done in the arrangements of FIGS. 2 and 3, a more sophisticated approach may detect the breakthrough by looking for a significant dropoff in the level of plasma detected by the coils. Use of a sample-and-hold circuit or any of various known circuits could be used to generate a breakthrough signal only after the magnetic fields detected by the coils had exceeded a given threshold and then had begun to drop off a significant amount.

Figure 4:
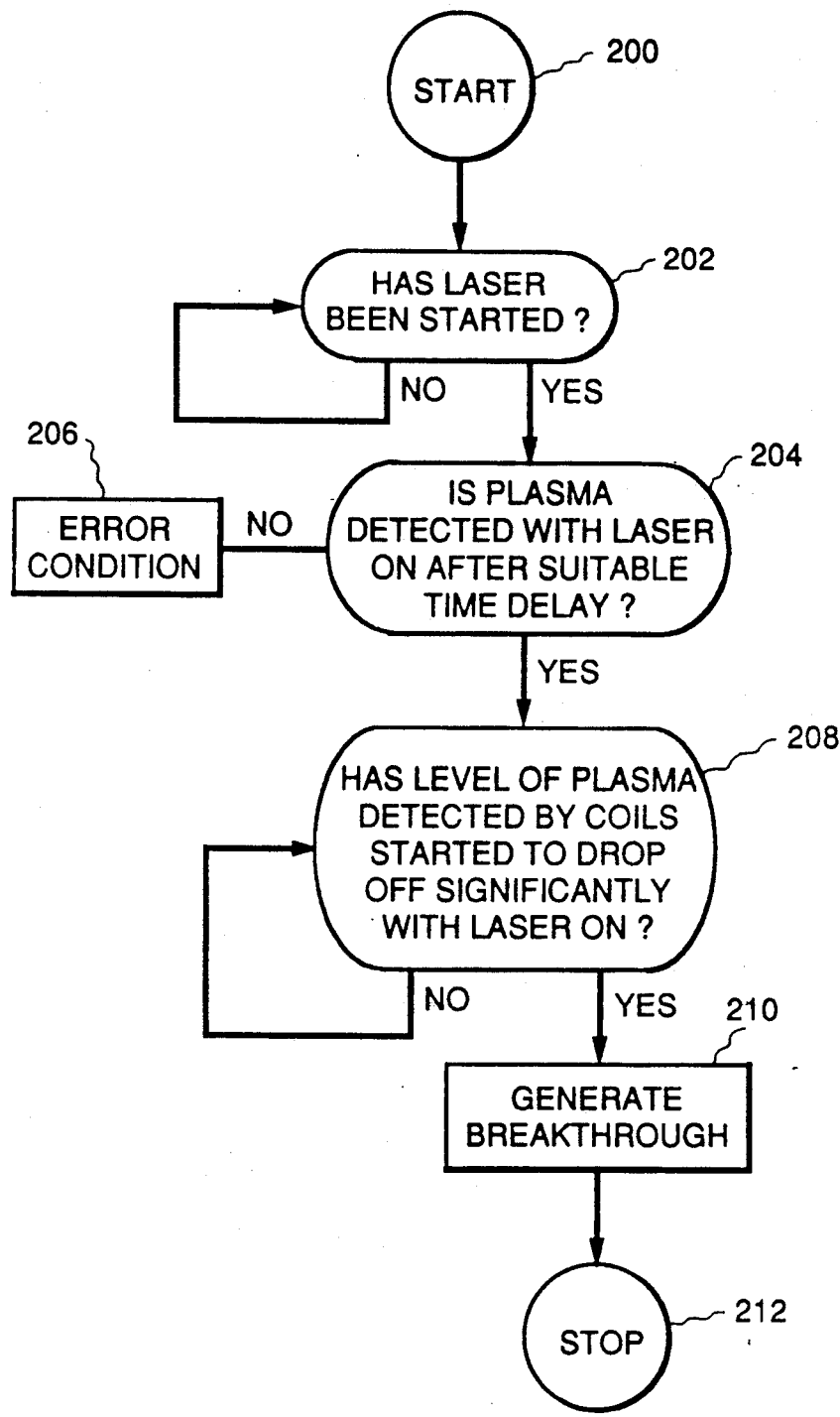
FIG. 4 shows a simplified flow chart illustrating operation of a breakthrough detector realized by a microprocessor.

Instead of the circuits of FIGS. 2 or 3 or the alternates discussed briefly immediately above, the real-time breakthrough detector 18 of FIG. 1 could be implemented by a microprocessor (not separately shown) together with appropriate input/output devices to allow the microprocessor to read the incoming signals from the coils 16C and 16S and to read the laser-on signal. Such a microprocessor could use the process illustrated by FIG. 4 wherein the start block 200 leads to block 202. Block 202 checks to determine if the laser has been started. If not, this is rechecked. If the laser has been started, control transfer to block 204 which tests to determine if plasma is detected. A microprocessor breakthrough detector would determine that by simply looking at the levels of signals received from the coils. As indicated, this test might be delayed shortly to allow sufficient time for the plasma to establish the magnetic fields. If the plasma is not detected, control may transfer optionally to block 206 which indicates an error condition. Alternately, and not shown in the drawing, control could return repeatedly to block 204 for rechecking for the plasma until plasma is actually detected. At any rate, upon detection of the plasma, block 204 leads to block 208 which checks to determine if the level of plasma detected (which must have been above some threshold to be detected at block 204) has started to decrease significantly in magnitude. If not, this is continually checked until the significant decrease in magnitude is detected, this being indicative of breakthrough. Upon that occurring, control transfers to block 210 which generates the breakthrough signal and leads to block 212 which stops the process.

When using the system 10 of the present invention, at least one coil such as 16C and 16S would be placed adjacent a surface on a front of a workpiece such as 12. The laser beam from laser 14 is then applied to an application point on the surface to drill a hole in the surface. The beam causes a magnetic field in an ionized plasma of particles escaping from the surface. The coil is used to sense a change in the magnetic field occurring upon breakthrough of the surface by the laser beam.

Although various details of preferred embodiments in carrying out the invention have been discussed it is to be understood that these are for illustrative purposes only. Various modifications and adaptations will be readily apparent to those of skill in the art. Accordingly, the scope of the present invention should be determined by reference to the claims appended hereto.

What is claimed is:

1. A method of applying a laser beam to a workpiece comprising the steps of
    placing at least one magnetic field pick-up coil adjacent a surface on a front of a workpiece;
    applying a laser beam to an application point on said surface to drill a hole in said surface, said laser beam causing a magnetic field in an ionized plasma of particles escaping from said surface; and
    using said magnetic field pick-up coil to sense magnetic field change occurring upon breakthrough of said surface by the laser beam.

2. The method of claim 1 further comprising the steps of generating a breakthrough signal upon the breakthrough and supplying said breakthrough signal to a control such that the control modifies the application of the laser beam.

3. The method of claim 2 wherein said laser beam drills a hole after which the breakthrough signal causes said control to turn off the laser beam.

4. The method of claim 3 wherein said magnetic field pick-up coil extends completely around said laser beam and in a stream of said ionized plasma of particles.

5. The method of claim 3 wherein said magnetic field pick-up coil is to the side of said laser beam and in a stream of said ionized plasma of particles.

6. The method of claim 2 further comprising the steps of generating a plasma-detected signal upon said magnetic field pick-up coil sensing a magnetic field change corresponding to the establishment of the ionized plasma of particles.

7. The method of claim 2 wherein said laser beam cuts said surface by drilling a hole, after which the breakthrough signal causes said control to, in turn, cause said laser beam to strike a new application point on said surface.

8. The method of claim 2 wherein the placing step includes placing at least two magnetic field pick-up coils adjacent the surface such that the magnetic field of the ionized plasma of particles is sensed by each of the two magnetic field pick-up coils.

9. The method of claim 8 wherein one of said magnetic field pick-up coils is to the side of said laser beam and in a stream of the ionized plasma of particles and the other of said magnetic field pick-up coils extends completely around said laser beam and in a stream of the ionized plasma of particles.

10. The method of claim 9 wherein the breakthrough signal is generated when neither of the two magnetic field pick-up coils is sensing the magnetic field of a stream of ionized plasma of particles.

11. A system for use when applying a laser beam to a workpiece comprising:
    at least one magnetic field pick-up coil; and
    a breakthrough detector connected to said magnetic field pick-up coil and
    including means to generate a breakthrough signal when a laser beam breaks through a workpiece to cause a magnetic field change sensed by said magnetic field pick-up coil.

12. The system of claim 11 further comprising a laser for applying a laser beam to a drill side of a workpiece wherein said magnetic field pick-up coil senses the magnetic field change when disposed on a drill side of a workpiece.

13. The system of claim 12 wherein said breakthrough detector further includes means to generate a plasmadetected signal upon said magnetic field pick-up coil sensing that a laser beam from said laser is striking a workpiece to generate a magnetic field in an ionized plasma of particles escaping the workpiece.

14. The system of claim 12 further comprising a control operable to receive said breakthrough signal and to modify application of a laser beam to a workpiece upon occurrence of the breakthrough signal.

15. The system of claim 14 wherein said control turns off said laser upon occurrence of the breakthrough signal.

16. The system of claim 14 further comprising means to generate a laser-on signal upon the laser being on and wherein said breakthrough detector has means to receive the laser-on signal and to inhibit production of the breakthrough signal unless the laser is on.

17. The system of claim 14 wherein said control, upon occurrence of the breakthrough signal, causes the laser beam from said laser to strike a new application point on the workpiece.

18. The system of claim 14 wherein two or more magnetic field pick-up coils are connected to said breakthrough detector.

19. The system of claim 18 wherein said means to generate the breakthrough signal generates the breakthrough signal only when neither of the two magnetic field pick-up coils is sensing the magnetic field of a stream of ionized plasma of particles.

20. The system of claim 19 wherein said breakthrough detector further includes means to generate a plasma-detected signal upon either of said two magnetic field pickup coils sensing that a laser beam from said laser is striking a workpiece to generate a magnetic field in an ionized plasma of particles escaping the workpiece.

* * * * *

UNITED STATES PATENT AND TRADEMARK OFFICE
CERTIFICATE OF CORRECTION

PATENT NO.  : 5,013,886

DATED       : May 7, 1991

INVENTOR(S) : Rudolph A. A. Koegl and Richard A. Hogle

It is certified that error appears in the above-identified patent and that said Letters Patent is hereby corrected as shown below:

Title page:
    RE: ATTORNEY, AGENT, OR FIRM

Please change Marilyn Glaubensklee; James C. Davis, Jr; Paul R. Webb, II to:

Paul R. Webb, II; James C. Davis, Jr.

Signed and Sealed this

Fifteenth Day of September, 1992

*Attest:*

DOUGLAS B. COMER

*Attesting Officer*   *Acting Commissioner of Patents and Trademarks*